(12) United States Patent
Suzuki et al.

(10) Patent No.: US 6,422,356 B1
(45) Date of Patent: Jul. 23, 2002

(54) AUTOMATIC TRANSMISSION WITH BAND BRAKE AND HYDRAULIC OPERATOR

(75) Inventors: Akitomo Suzuki; Hiroshi Tsutsui; Tsuyoshi Kawamoto; Masahiro Ida; Yoshihisa Yamamoto; Masaaki Nishida; Kazumasa Tsukamoto, all of Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/401,965

(22) Filed: Sep. 22, 1999

(30) Foreign Application Priority Data

Sep. 22, 1998 (JP) .......................................... 10-268674

(51) Int. Cl.⁷ .............................. F16H 5/64; F16H 63/30
(52) U.S. Cl. .................... 188/77 R; 188/336; 475/269; 92/50
(58) Field of Search ............................. 188/77 W, 336, 188/77 R; 475/146, 138, 269

(56) References Cited

U.S. PATENT DOCUMENTS

| | | | | |
|---|---|---|---|---|
| 2,184,745 A | * | 12/1939 | Kinneman | |
| 3,838,624 A | * | 10/1974 | Mita et al. ........................ | 91/1 |
| 3,991,833 A | * | 11/1976 | Ruppert ........................ | 173/20 |
| 4,388,986 A | * | 6/1983 | Umezawa ................. | 188/77 R |
| 4,601,233 A | * | 7/1986 | Sugano ........................... | 92/52 |
| 4,713,984 A | * | 12/1987 | Ohkubo ........................ | 74/732 |
| 4,787,494 A | * | 11/1988 | Ogasawara et al. ........... | 192/86 |
| 4,895,236 A | * | 1/1990 | Sakakibara ................... | 192/84 |
| 4,930,373 A | * | 6/1990 | Nakawaki .................... | 475/128 |
| 5,016,521 A | * | 5/1991 | Haka .......................... | 92/13.1 |
| 5,253,549 A | * | 10/1993 | Younger ..................... | 475/146 |
| 5,305,863 A | * | 4/1994 | Gooch et al. ............. | 192/70.12 |
| 6,044,937 A | * | 4/2000 | Yamada ..................... | 188/77 R |
| 6,071,208 A | * | 6/2000 | Koivunen ................... | 475/275 |
| 6,227,340 B1 | * | 5/2001 | Braford, Jr. ................ | 192/48.7 |

FOREIGN PATENT DOCUMENTS

| | | | |
|---|---|---|---|
| DE | 3608934 | * | 9/1987 |
| EP | 0602706 | * | 6/1994 |
| JP | 60222628 | * | 11/1985 |
| JP | 62037547 | * | 2/1987 |
| JP | 62075163 | * | 4/1987 |
| JP | 1199046 | * | 8/1989 |
| JP | 04107329 | * | 4/1992 |

* cited by examiner

*Primary Examiner*—Eric Culbreth
*Assistant Examiner*—David Divine
(74) *Attorney, Agent, or Firm*—Lorusso & Loud

(57) ABSTRACT

The automatic transmission of the present invention prevents fluctuation of torque transmission through a band brake. In the hydraulic operator for the band brake, a resilient elastic cushion is provided between a rod abutting one end of the band of the band brake and a piston. Any slippage between the band and drum of the band brake will result in oscillation of the rod. However, the elastic cushion absorbs oscillation of the rod, thereby isolating the piston from that oscillation.

12 Claims, 11 Drawing Sheets

FIG. 6

| | C1 | C2 | C3 | B1 | B2 | B3 | B4 | B5 | F1 | F2 |
|---|---|---|---|---|---|---|---|---|---|---|
| N | | | | | | | | O | | |
| 1ST | O | | | | | ◌ | | O | | O |
| 2ND | O | | | □ | O | | | O | O | |
| 3RD | O | | | O | O | | O | | O | |
| 4TH | O | | O | O | O | | | | O | |
| 5TH | O | O | O | | O | | | | | |
| 3Low | O | O | | | O | | | O | | |
| 4Low | O | O | | | O | | O | | | |
| REV | | O | | | | O | | O | | |

◌ The dotted circle represents operation of engine brake.

□ The square represents operation in case of necessity.

US 6,422,356 B1

AUTOMATIC TRANSMISSION WITH BAND BRAKE AND HYDRAULIC OPERATOR

INCORPORATION BY REFERENCE

The disclosure of Japanese Patent Application No. HEI 10-268674 filed on Sep. 22, 1998, including the specification, drawings and abstract, is incorporated herein by reference in its entirety.

BACKGROUND OF THE INVENTION

1. Field of the Invention

The present invention relates to an automatic transmission installed in a motor vehicle and, more particularly, to a hydraulic operator for a band brake within the automatic transmission, which band brake includes a flexible band strip and which is operated to perform a speed-change operation in shifting to a predetermined speed stage.

2. Description of the Related Art

In general, an automatic transmission is provided with a speed-change gear mechanism, a torque converter or the like. The speed-change gear mechanism is composed of planetary gearing. As shown in FIG. 1, a drum 1 is coupled to an element of the speed-change gear mechanism such that the drum 1 rotates integrally with the element. A band 2, which is a flexible band strip, is wound around the drum 1, and a hydraulic servo 3 is driven so that the band 2 tightens on the drum 1. In this manner, a speed-change operation is performed.

The band 2 is wound around the drum 1 with one end 2a being secured to a casing.

The hydraulic servo 3 has a cylinder casing 30 disposed in the casing of the automatic transmission and a piston 31 oil-tightly fitted within the cylinder casing 30. A return spring 34, which is interposed between one side of the piston 31 and the casing 30, urges the piston 31 leftwards in FIG. 1. Furthermore, an end plate 8 is axially and oil-tightly fitted to the end of the cylinder casing 30. The end plate 8 and the piston 31 define a brake engagement hydraulic chamber 32 therebetween. A rod 33, which is supported by the piston 31, projects from one side of the casing 30 and abuts a stop 2b on a second end 2c of the band 2. When a hydraulic pressure is supplied to the brake engagement hydraulic chamber 32, the rod 33 moves rightwards in FIG. 1, so that the band 2 tightens on the drum 1.

In the aforementioned automatic transmission M1, the drum 1 rotates clockwise in a de-energizing direction A (in the direction of counter-lock) at a certain speed stage, whereas the drum 1 rotates counterclockwise, in a self-energizing direction B (in the direction of self-lock) at another speed stage. The aforementioned hydraulic servo 3 is driven so that the band 2 acts either on the de-energizing side or on the self-energizing side to stop rotation of the drum 1. In this manner, a speed-change operation to a predetermined speed stage is performed.

However, in the automatic transmission employing the band 2, the state of engagement between the band 2 and the drum 1 changes discontinuously due to slippage until the drum 1 is finally stopped. As a result, there is a problem of oscillation (hereinafter referred to as "judder") with a frequency of about 30 Hz as well as fluctuation of the output torque. The problem associated with generation of judder is especially serious on the de-energizing side. The band 2 does not uniformly engage the drum 1 in tightening on the drum 1 and thus causes a change in frictional characteristic. Due to the aforementioned de-energizing effect, the rod 33 stops and starts when driven by the hydraulic servo 3. Consequently, fluctuation of output torque occurs. This is considered to be the cause of the aforementioned problem regarding generation of "judder."

SUMMARY OF THE INVENTION

It is thus an object of the present invention to provide an automatic transmission that prevents generation of "judder" as well as fluctuation in output torque deriving from operation of a band brake.

According to the present invention, there is provided an automatic transmission with a band brake including a rotational body ("drum") rotating integrally with an element of a speed-change gear mechanism, a flexible band strip wound around the rotational body, and a hydraulic servo for operating the flexible band strip. In this automatic transmission, the hydraulic servo is driven such that the flexible band strip tightens on the rotational body in a speed-change operation. The hydraulic servo has a cylinder casing, a piston reciprocally mounted within the cylinder casing, a rod disposed to engage with the flexible band strip, and an elastic member disposed between the piston and the rod, whereby a hydraulic force is transmitted from the piston to the rod through the elastic member to tighten the flexible band strip on the rotational body. The elastic member is designed to absorb forces on the rod caused when a torque is being transmitted by the flexible band strip.

At a given speed-change stage where an element of the speed-change gear mechanism rotates integrally with the rotational body, the hydraulic servo is driven to transmit a hydraulic force from the piston through the elastic member to extend the rod. Thereby, the rod engages the flexible band strip, and the flexible band strip tightens on the rotational body. As a result, the element of the speed-change gear mechanism and the rotational body to which it is fixed are stopped from rotating, and the speed-change operation is performed. Even if the state of engagement of the flexible band strip on the rotational body is uneven, e.g. due to slippage, prior to stoppage of the rotational body, the elastic member absorbs displacements (oscillation) of the rod.

According to the present invention, when the flexible band strip tightens on the rotational body, the elastic member absorbs oscillation of the rod. Thus, the flexible band strip tightens on the rotational body with a substantially constant tightening force, whereby generation of judder as well as fluctuation of output torque is prevented.

In the present invention the rod is supported by the piston for axial movement relative thereto, and the elastic member is a disc spring interposed between the piston and the rod. So constructed, the disc spring serves to prevent oscillation of the rod. Therefore, it is possible to effectively absorb any oscillation of the rod, utilizing an elastic member having a large modules of elasticity, without increasing the size of the hydraulic servo.

Further, in embodiments wherein the elastic member is composed of at least two springs which have different moduluses of elasticity and are connected in series, the two springs serve to absorb oscillation of the flexible band strip both on the self-energizing side and on the de-energizing side. Accordingly, it is possible to effectively prevent generation of judder both in self-energizing and de-energizing.

The present invention also provides a supporting plate disposed between the piston and the rod for movement in the same direction as the piston, a first spring disposed between the supporting plate and the rod, and a second spring disposed between the supporting plate and the cylinder casing coaxial with the first spring, and the elastic member is disposed between the supporting plate and the piston. In this construction, unless the hydraulic force has reached a predetermined value, the second piston returns the first spring. Conversely, if the hydraulic force has become equal to or exceeded the predetermined value, the first spring serves to absorb impact.

BRIEF DESCRIPTION OF THE DRAWINGS

FIG. 6 is a table of operations of respective frictional engagement elements of the automatic transmission of FIG. 5.

DETAILED DESCRIPTION OF PREFERRED EMBODIMENTS

Embodiments of the present invention will now be described with reference to FIGS. 2 through 11.

Figure 2:
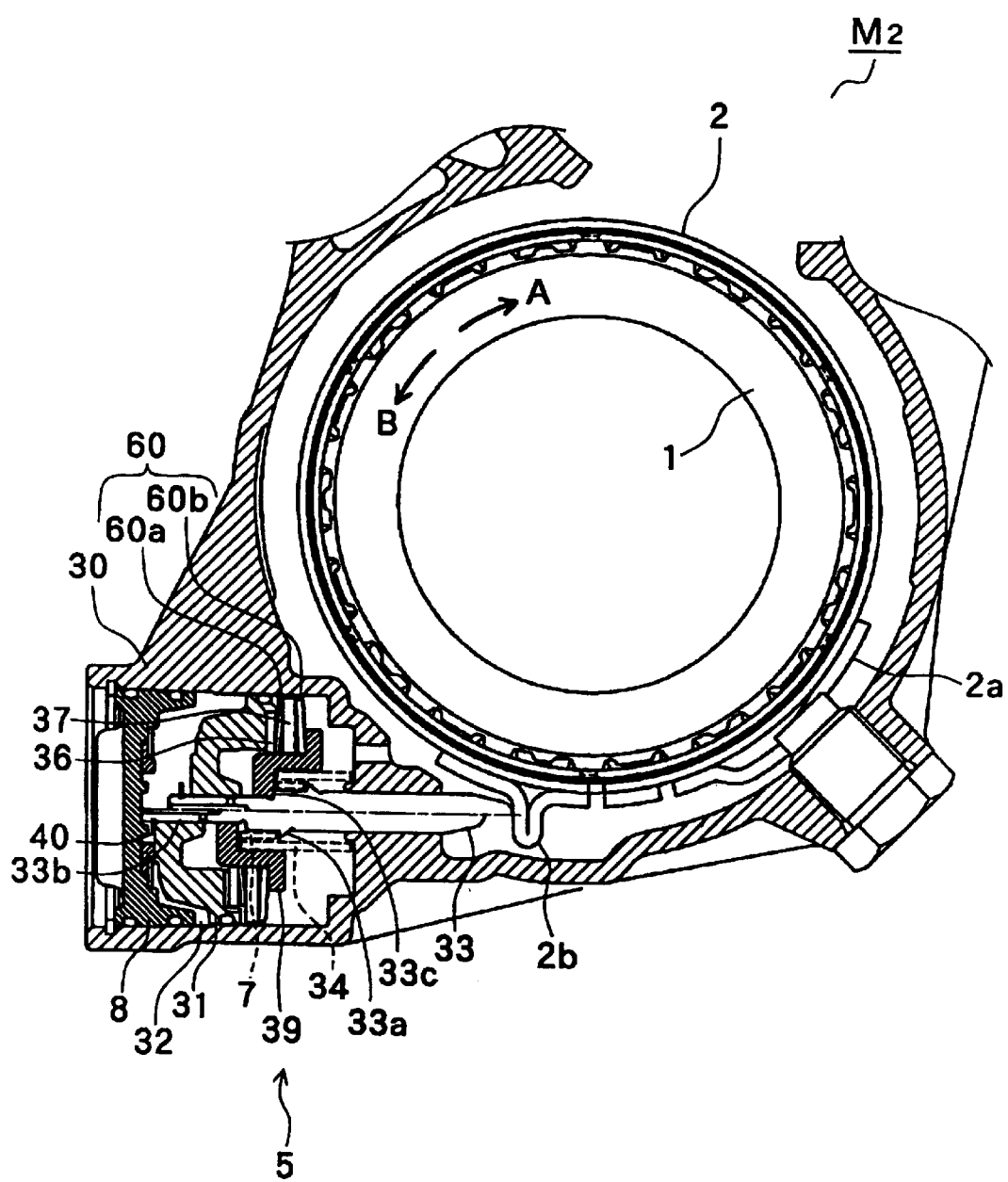
FIG. 2 is a cross-sectional view showing one embodiment of a band brake and hydraulic servo operator according to the present invention.

FIG. 2 shows part of the structure of an automatic transmission incorporating a first embodiment of the present invention. An automatic transmission M2 shown in FIG. 2 is provided with a speed-change gear mechanism including planetary gearing (see FIG. 5), and a drum (rotational body) 1 is coupled to an element of the planetary gearing for rotation integrally therewith. A flexible band strip 2, is wound around the drum 1, and the band 2 has one end 2a fixed to a casing.

Furthermore, the automatic transmission M2 is provided with a hydraulic servo 5 for operating the band 2. The hydraulic servo 5 is provided with a cylinder casing 30. A piston 31 is oil-tightly mounted within the cylinder casing 30 for reciprocating axial movement therein. A return spring 34 is interposed between a support plate 39 and the cylinder casing 30.

A rod 33 is supported by the piston 31 for axial movement relative to piston 31. The rod 33 is disposed projecting from the casing 30 engaging a stop or bracket 2b on a second end 2c of the band 2. A cushion plate 60, which is an annular elastic member, is disposed in a position to enable transmission therethrough of a hydraulic force from the piston 31 to the rod 33 for tightening the band 2 on the drum 1.

To be more specific, the cushion plate 60 has a small-diameter disc spring 60a and a large-diameter disc spring 60b. The small-diameter disc spring 60a is interposed between a plate 36 and an intermediate plate 37. The plate 36 is provided between the small-diameter disc spring 60a and the piston 31. The large-diameter disc spring 60b is interposed between the intermediate plate 37 and the support plate 39. The support plate 39 is disposed in a power transmission path between the piston 31 and the rod 33, with a central portion of the support plate 39 being slidably supported by the rod 33 so that the support plate 39 can move in the same direction as the piston 31. In addition, the small-diameter and large-diameter disc springs 60a and 60b, the plate 36 and the intermediate plate 37 are all supported at their interior circumference on an intermediate, axially extending annular stage portion of the supporting plate 39. The large-diameter disc spring 60b abuts a radially extending flange port ion of the support plate 39. That is, in the hydraulic servo 5 shown in FIG. 2, the two disc springs 60a and 60 b are interposed in series between the piston 31 and the rod 33, more precisely, between the piston 31 and the support plate 39. The modulus of elasticity of disc spring 60a is different from that of disc spring 60b.

Furthermore, the rod 33 has a small-diameter portion 33b at its piston side end. The piston 31 and the support plate 39 are slidably fitted on the small-diameter portion 33b. A snap ring 40 is fitted on portion 33b adjacent the piston to limit axial movement of the piston 31 and support plate 39 relative to rod 33, i.e. to prevent rod 33 from sliding out of piston 31 and support plate 39.

An outer spring (a second spring) 34, which is a return spring for returning the piston 31, is disposed between the support plate 39 and the cylinder casing 30. An inner spring (a first spring) 7, for absorbing impact, is disposed between the support plate 39 and an annular protrusion 33a formed on the rod 33. The outer spring 34 and the inner spring 7 are thereby integrated into a single structure.

Furthermore, an end plate 8 is fixed to an end portion of the cylinder casing 30 to oil-tightly close cylinder casing 30. The end plate 8 and the piston 31 define a brake engagement hydraulic chamber 32 therebetween. When the piston 31 abuts against the end plate 8, the inner spring 7 is compressed by a predetermined length in comparison with its free length. A predetermined distance is required between the piston 31 and the support plate 39.

Figure 3:
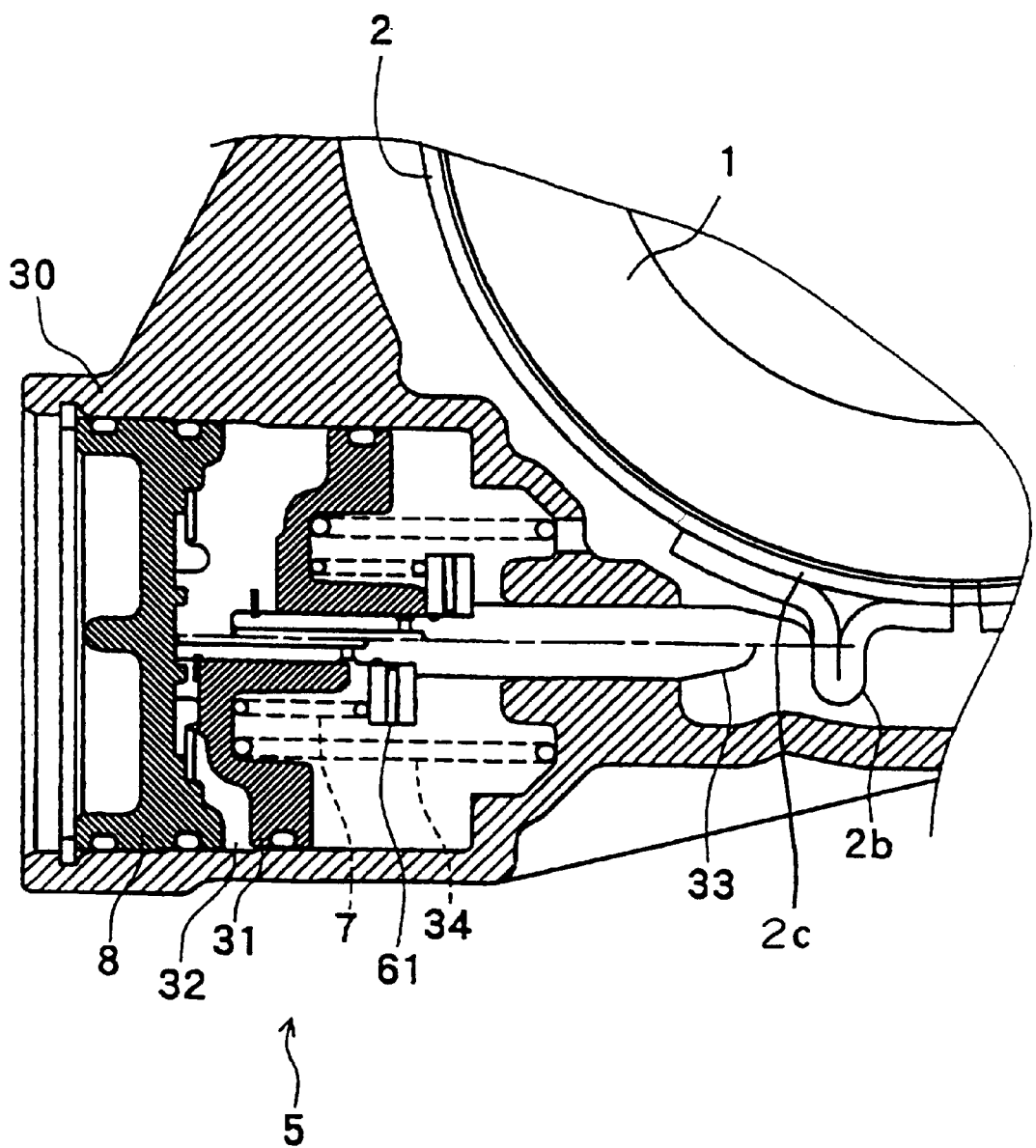
FIG. 3 is a partial cross-sectional view of a second embodiment of a band brake and hydraulic servo operator according to the present invention.
Figure 4:
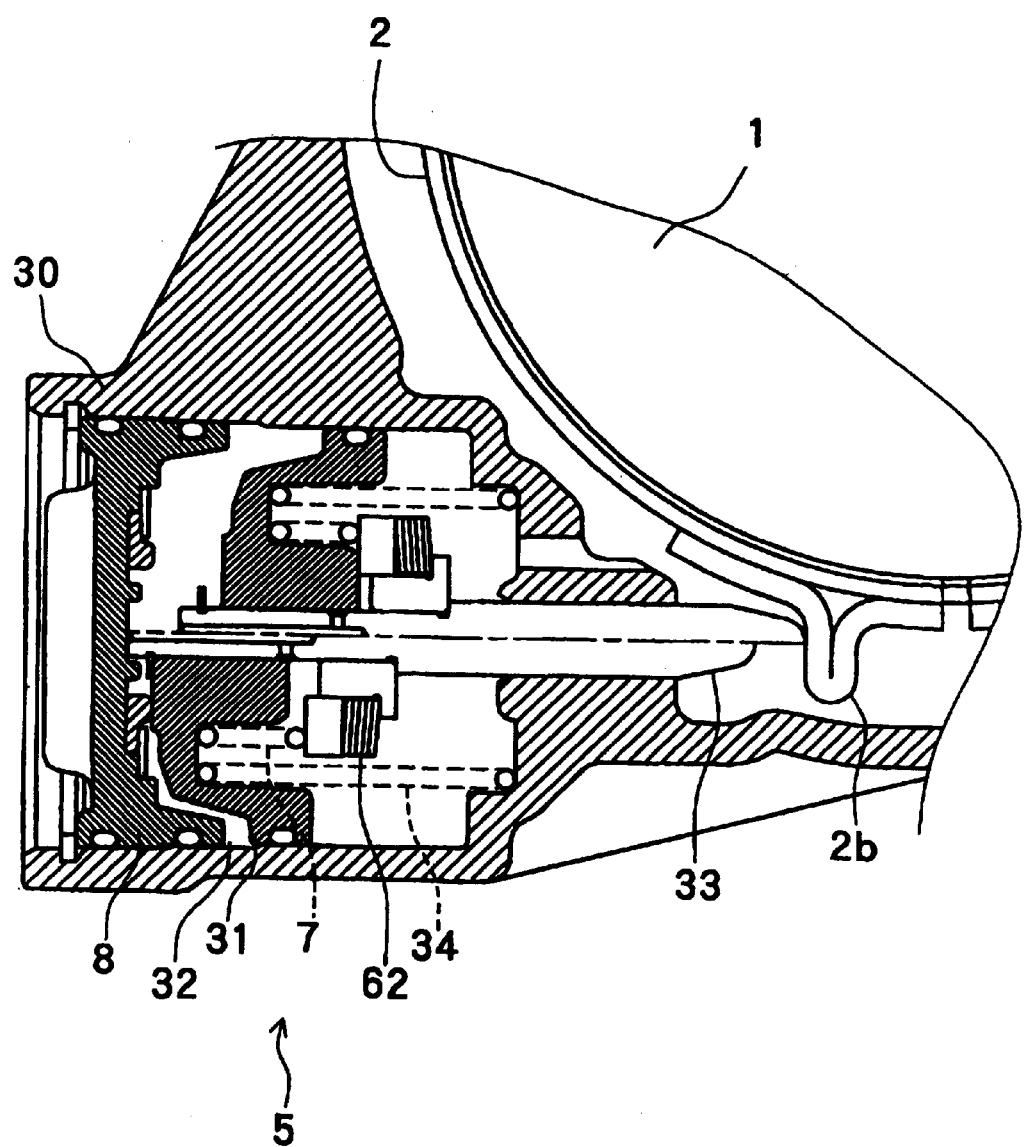
FIG. 4 is a partial cross-sectional view of a third embodiment of a band brake and hydraulic servo operator according to the present invention.

Next, a partially modified embodiment of the present invention will be described with reference to FIGS. 3 and 4. Components identical to those of the aforementioned embodiment are denoted by the same reference numerals and are not described again. In FIG. 3, a cushion plate (elastic member) 61 composed of a disc spring is used. In FIG. 4, a cushion plate (elastic member) 62 is composed of a plurality of (e.g. five as shown in the drawing) disc springs of the same diameter.

A speed-change gear mechanism of the automatic transmission M2 to which the aforementioned band brake device can be applied will now be described with reference to FIG. 5.

Figure 5:
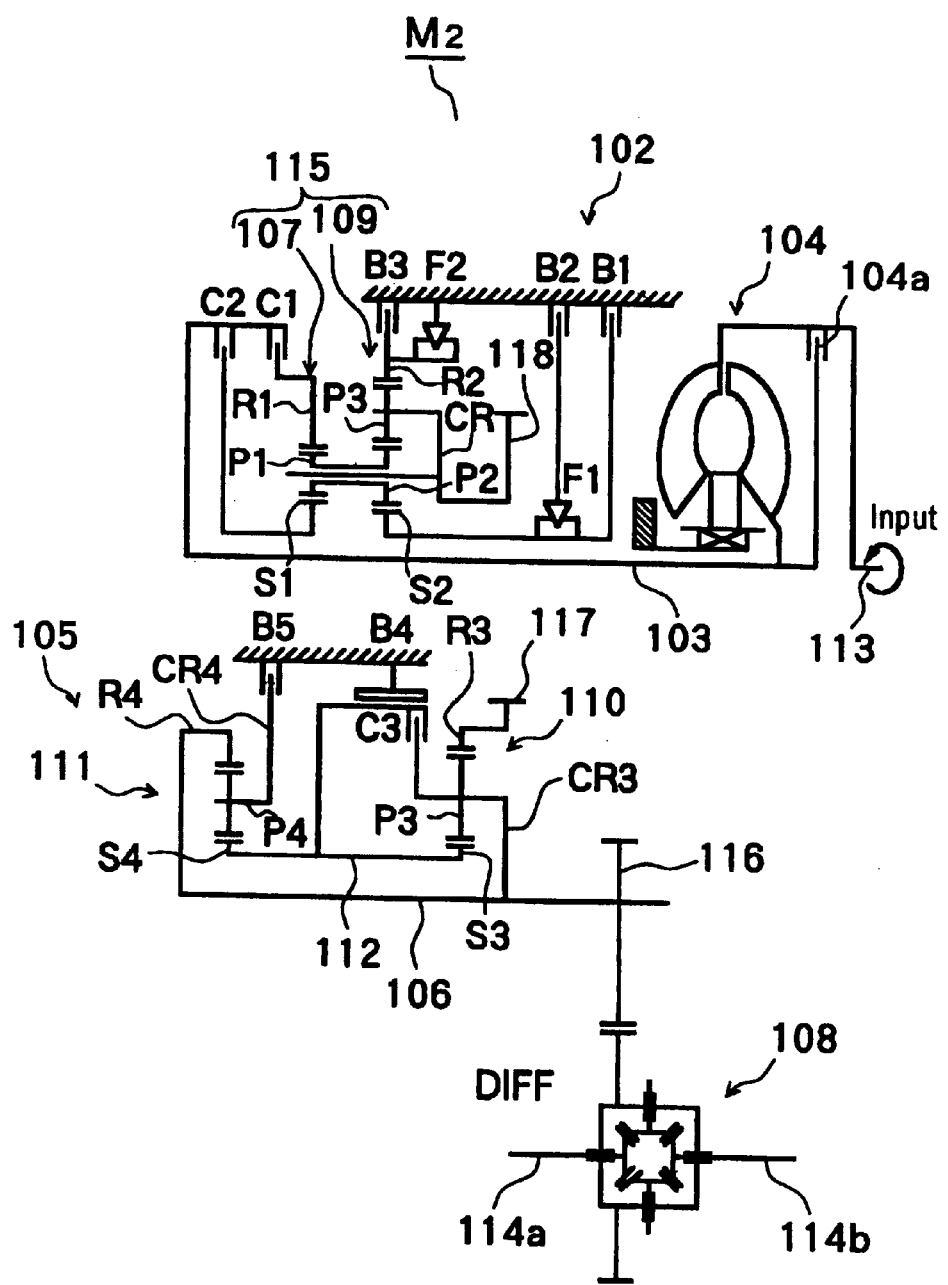
FIG. 5 is a skeletal diagram of the mechanical section of an automatic transmission to which the present invention can be applied.

As shown in FIG. 5, a five-speed automatic transmission M2 is provided with a torque converter 104, a three-speed primary speed-change mechanism 102, a three-speed secondary speed-change mechanism 105 and a differential 108, which are interconnected to one another and accommodated in an integral-type casing 120. The torque converter 104 is provided with a lock-up clutch 104a, and inputs torque to an input shaft 103 of the primary speed-change mechanism 102 through hydraulic flow within the torque converter or mechanical connection by means of the lock-up clutch. The first shaft 103 (more specifically, the input shaft), a second shaft 106 (counter shaft), and third shafts (left and right vehicle wheel shafts) 114a and 114b are rotatably supported by the integral-type casing 120. The first shaft 103 is aligned with a crank shaft, and the second shaft 106 and the third shafts 114a and 114b are disposed in parallel with the first shaft 103. A valve body is disposed exterior to the casing 120.

The primary speed-change mechanism 102 has a planetary gear unit 115 that is composed of a simple planetary gear unit 107 and a double pinion planetary gear unit 109. The simple planetary gear unit 107 is composed of a sun gear S1, a ring gear R1 and a carrier CR, which supports a pinion P1 engaging ring gear R1 and sun gear S1. The double pinion planetary gear unit 109 is composed of a sun gear S2, a ring gear R2 and the carrier CR. The number of teeth of the sun gear S2 is different from that of the sun gear S1. Together with the pinion P1 of the simple planetary gear unit 107, the carrier CR commonly supports a pinion P2 engaging the sun gear S2 and a pinion P3 engaging the ring gear R2.

The input shaft 103, which is connected with an engine crank shaft 113 through the torque converter 104, can be coupled to the ring gear R1 of the simple planetary gear unit 107 through a first (forward) clutch C1, and can be coupled to the sun gear S1 of the simple planetary gear unit 107 through a second (direct) clutch C2. The sun gear S2 of the double pinion planetary gear unit 109 can be directly engaged by a first brake B1, and can be engaged by a second brake B2 through a first one-way clutch F1. Furthermore, the ring gear R2 of the double pinion planetary gear unit 109 can be engaged by a third brake B3 and a second one-way clutch F2. The common carrier CR is coupled to a counter drive gear 118, which is an output member of the primary speed-change mechanism 102.

The secondary speed-change mechanism 105 has an output gear 116, a first simple planetary gear unit 110 and a second simple planetary gear unit 111, which are axially arranged in this order toward a rear end of the counter shaft 106 constituting the second shaft. The counter shaft 106 is rotatably supported by the integral-type casing 120 through a bearing. The first and second simple planetary gear units 110 and 111 are of a Simpson type.

The first simple planetary gear unit 110 has a ring gear R3 and a sun gear S3. The ring gear R3 is coupled to a counter driven gear 117 which engages the counter drive gear 118, and the sun gear S3 is fixed to a sleeve shaft 112 which is rotatably supported by the counter shaft 106. The pinion P3 is supported by a carrier CR3, which is in the form of a flange integrally coupled to the counter shaft 106. The carrier CR3, which supports the other end of the pinion P3, is coupled to an inner hub of a UD direct clutch C3.

The second simple planetary gear unit 111 has a sun gear S4 and a ring gear R4. The sun gear S4 is formed on the sleeve shaft 112 and coupled to the sun gear S3 of the first simple planetary gear unit. The ring gear R4 is coupled to the counter shaft 106.

The UD direct clutch C3 is interposed between the carrier CR3 of the first simple planetary gear unit 110 and the coupled sun gears S3 and S4. The coupled sun gears S3 and S4 can be engaged a fourth brake B4 which is a band brake. Furthermore, a carrier CR4 for supporting a pinion P4 of the second simple planetary gear unit 111 can be engaged by a fifth brake B5.

The operation of the mechanical section of the five-speed automatic transmission will now be described with reference to FIGS. 5 and 6.

In a first (1ST) speed state in a D (drive) range, the forward clutch C1 is connected, and the fifth brake B5 and the second one-way clutch F2 are engaged, so that the ring gear R2 of the double pinion planetary gear unit 109 and the carrier CR4 of the second simple planetary gear unit 111 are held against rotation (stopped state). In this state, rotation of the input shaft 103 is transmitted to the ring gear R1 of the simple planetary gear unit 107 through the forward clutch C1, and the ring gear R2 of the double pinion planetary gear unit is in a stopped state. Therefore, while both the sun gears S1 and S2 are idle-rotated, the common carrier CR is rotated in a positive direction with a significant deceleration. That is, the primary speed-change mechanism unit 102 is in the first speed state, and the decelerated rotation is transmitted to the ring gear R3 of the first simple planetary gear unit 110 in the secondary speed-change mechanism 105 through counter gears 118 and 117. The secondary speed-change mechanism 105 is in the first speed state, with the carrier CR4 of the second simple planetary gear unit 111 being stopped by the fifth brake B5. The decelerated rotation of the primary speed-change mechanism 102 is further decelerated by the secondary speed-change mechanism 105 and output from the output gear 116.

In a second (2ND) speed state, the second brake B2 (and the first brake B1) are engaged in addition to the forward clutch C1. Moreover, operation is switched from the second one-way clutch F2 to the first one-way clutch F1, and the fifth brake B5 is maintained in a state of engagement. In this state, the sun gear S2 is stopped by the second brake B2 and the first one-way clutch F1. Therefore, rotation of the ring gear R1 of the simple planetary gear unit 107 that has been transmitted from the input shaft 103 through the forward clutch C1 causes the carrier CR to rotate in the positive direction with a deceleration, while idle-rotating the ring gear R2 of the double pinion planetary gear unit 109 in the positive direction. Furthermore, the decelerated rotation is transmitted to the secondary speed-change mechanism 105 through the counter gears 118 and 117. That is, the primary speed-change mechanism 102 is in the second speed state, and the secondary speed-change mechanism 105 is in the first speed state due to engagement of the fifth brake B5. Thus, the second speed state is combined with the first speed state, whereby the second speed is obtained in the automatic transmission M2 as a whole. In this state, the first brake B1 is also engaged. However, if the second speed is obtained through coast-down, the first brake B1 is released. In a third (3RD) speed state, the forward clutch C1, the second brake B2, the first one-way clutch F1 and the first brake B1 are still maintained in a state of engagement. In this state, the fifth brake B5 is released and the fourth brake B4 is engaged. That is, the primary speed-change mechanism 102 is maintained as is, and the rotation at the time of the aforementioned second speed is transmitted to the secondary speed-change mechanism 105 through the counter gears 118 and 117. Then, in the secondary speed-change mechanism 105, the rotation transmitted from the ring gear R3 of the first simple planetary gear 110 is output from the carrier CR3 as second speed rotation, due to fixation of the sun gear S3 and the sun gear S4. Accordingly, the second speed state of the primary speed-change mechanism 102 is combined with the second speed state of the secondary speed-change mechanism 105, whereby the third speed state is obtained in the automatic transmission M2 as a whole.

In a fourth (4TH) speed state, the primary speed-change mechanism 102 is in the same state as the aforementioned second and third speed states, with the forward clutch C1, the second brake B2, the first one-way clutch F1 and the first brake B1 being engaged. In the secondary speed-change mechanism 105, the fourth brake B4 is released and the UD direct clutch C3 is engaged. In this state, the carrier CR3 and the sun gears S3 and S4 of the first simple planetary gear unit 110 are coupled to each other, so that the planetary gear units 110 and 111 rotate integrally and hence provide direct-coupled rotation. Thus, the second speed state of the primary speed-change mechanism 102 is combined with the direct-coupled (third speed) state of the secondary speed-change mechanism 105, whereby the fourth speed rotation is output from the output gear 116 in the automatic transmission as a whole.

In a fifth (5TH) speed state, the forward clutch C1 and the direct clutch C2 are engaged, and rotation of the input shaft 103 is transmitted to both the ring gear R1 and the sun gear S1 of the simple planetary gear unit 107. As a result, the primary speed-change mechanism 102 provides direct-coupled rotation in which the gear unit rotates integrally. In this state, the first brake B1 is released and the second brake B2 is maintained in a state of engagement. However, the first one-way clutch F1 idle-rotates, whereby the sun gear S2 idle-rotates. The secondary speed-change mechanism 105 undergoes direct-coupled rotation when the UD direct clutch C3 is engaged. Thus, the third speed (direct-coupled) state of the primary speed-change mechanism 102 is combined with the third speed (direct-coupled) state of the secondary speed-change mechanism 105, whereby the fifth speed rotation is output from the output gear 116 in the automatic transmission as a whole.

Furthermore, this automatic transmission is provided with intermediate speed-change stages operating at the time of down-shift such as acceleration of the vehicle, namely, a third speed low stage and a fourth speed low stage.

In a third speed low state, the forward clutch C1 and the direct clutch C2 are engaged (the second brake B2 is in a state of engagement but overruns due to the one-way clutch F1), and the primary speed-change mechanism 102 is in the third speed state in which the planetary gear unit 115 is directly coupled. On the other hand, the secondary speed-change mechanism 105 is in the first speed state with the fifth brake B5 being engaged. Accordingly, the third speed state of the primary speed-change mechanism 102 is combined with the first speed state of the secondary speed-change mechanism 105, whereby the aforementioned speed-change stage for achieving a gear ratio between the second and third speeds is obtained in the automatic transmission M2 as a whole.

In a fourth speed low state, the forward clutch C1 and the direct clutch C2 are engaged, and the primary speed-change mechanism 102 is in the third speed (direct-coupled) state, as in the aforementioned third speed low state. On the other hand, the secondary speed-change mechanism 105 is in the second speed state in which the fourth brake B4 is engaged and the sun gear S3 of the first simple planetary 110 and the sun gear S4 of the second simple planetary gear 111 are fixed. Thus, the third speed state of the primary speed-change mechanism 102 is combined with the second speed state of the secondary speed-change mechanism 105, whereby the aforementioned speed-change stage for achieving a gear ratio between the second and third speeds is obtained in the automatic transmission M2 as a whole.

A dotted circle in FIG. 6 denotes the operational state (four, three or two ranges) of an engine brake in coasting. That is, in the first speed state, the third brake B3 operates to prevent rotation of the ring gear R2 resulting from overrunning of the second one-way clutch F2. In the second, third and fourth speed states, the first brake B1 operates to prevent rotation of the sun gear S1 resulting from overrunning of the first one-way clutch F1.

In a R (reverse) range, the direct clutch C2 and the third brake B3 are engaged, and the fifth brake B5 is also engaged. In this state, rotation of the input shaft 103 is transmitted to the sun gear S1 through the direct clutch C2, and the ring gear R2 of the double pinion planetary gear unit 109 is stopped by engagement of the third brake B3. The carrier CR rotates in reverse while causing the ring gear R1 of the simple planetary gear unit 107 to rotate in reverse. This reverse rotation is transmitted to the secondary speed-change mechanism 105 through the counter gears 118 and 117. The secondary speed-change mechanism 105 is maintained in the first speed state in which the carrier CR4 of the second simple planetary gear unit 111 is also stopped in the direction of reverse rotation by engagement of the fifth brake B5. Thus, reverse rotation of the primary speed-change mechanism 102 is combined with the first speed rotation of the secondary speed-change mechanism 105, whereby decelerated reverse rotation is output from the output shaft.

The fourth brake B4, which is engaged in the aforementioned third speed state, constitutes the band brake of the present invention.

Figure 1:
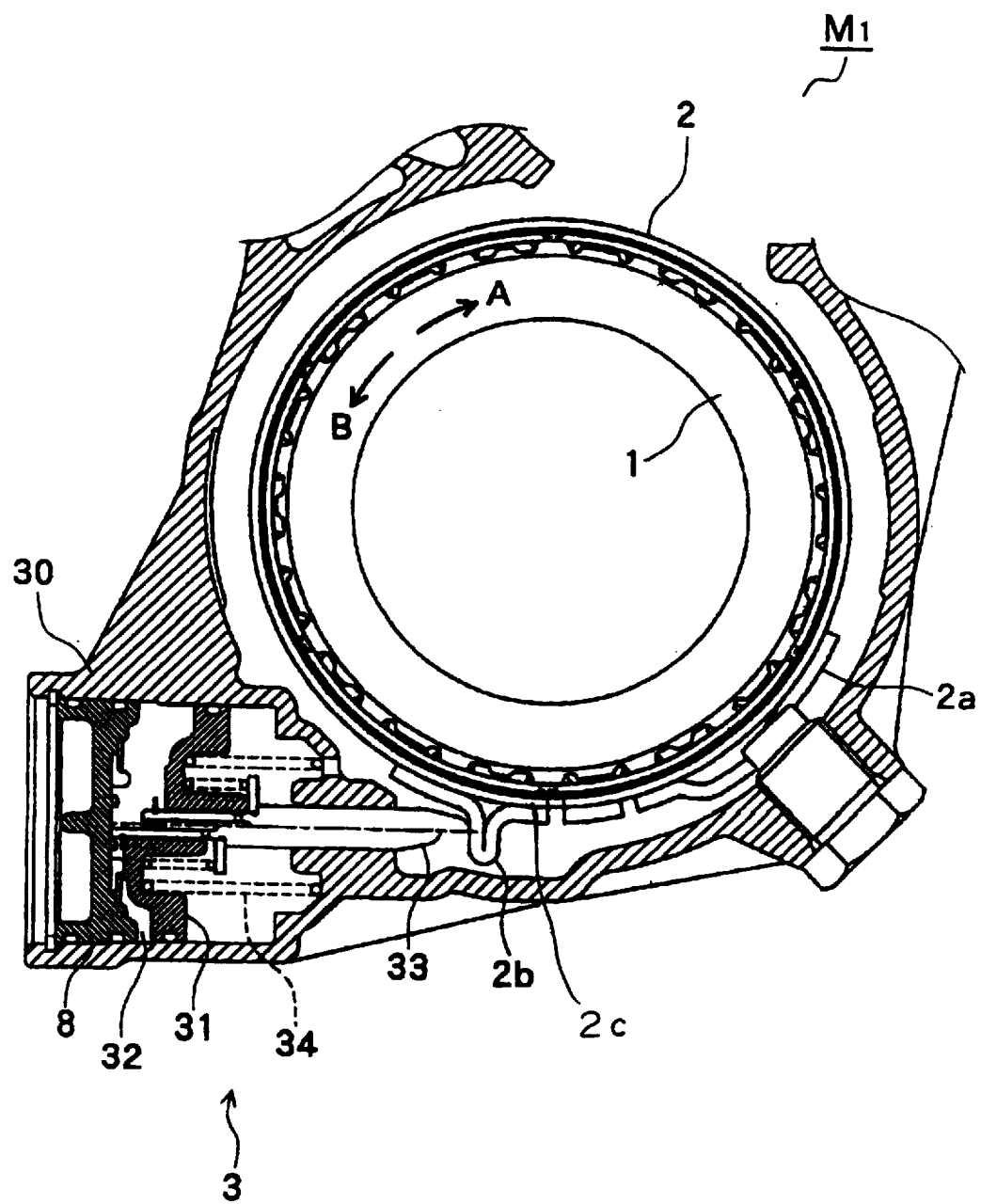
FIG. 1 is a cross-sectional view showing the structure of a band brake and hydraulic servo operator according to the related art.
Figure 7:
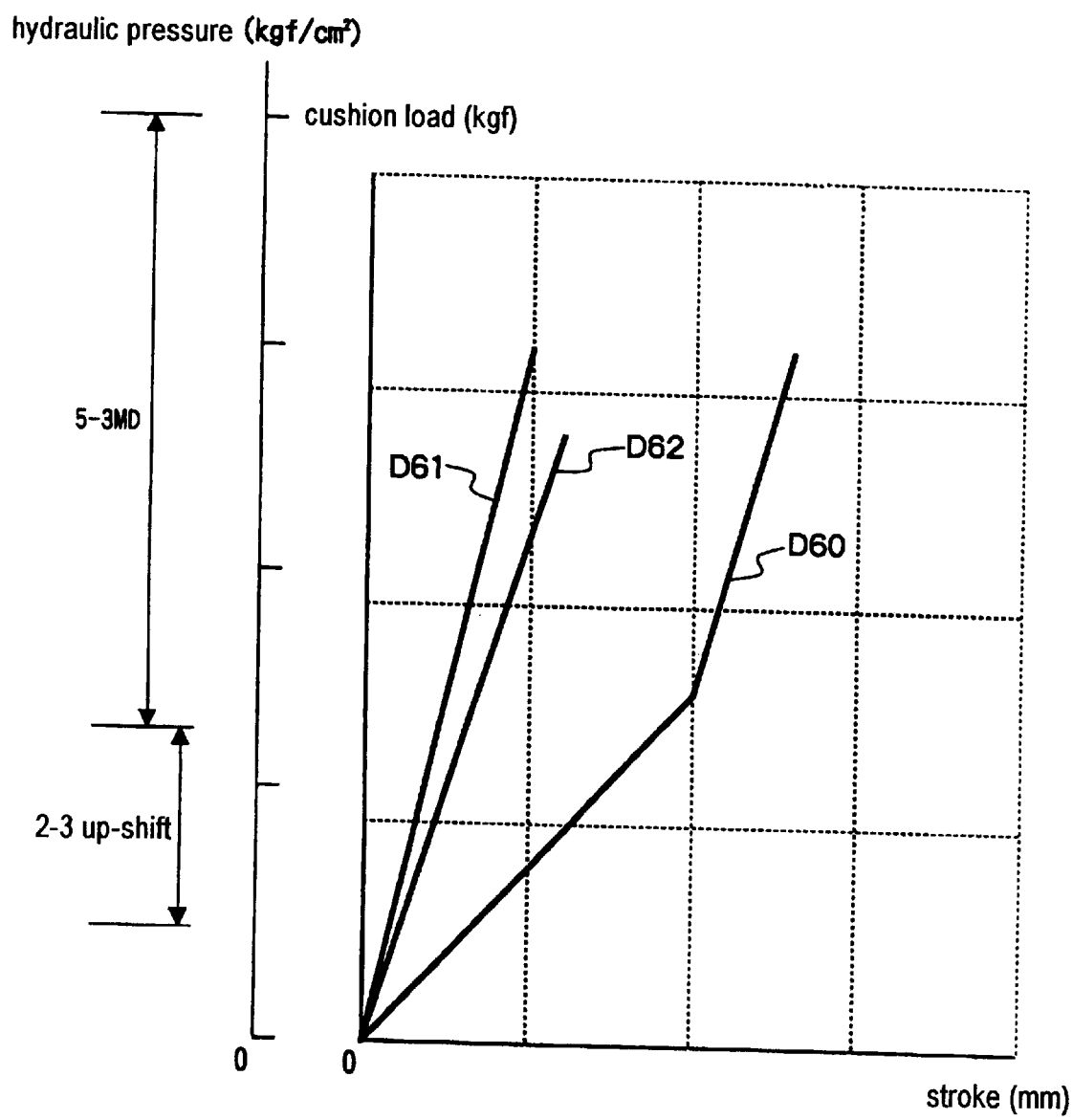
FIG. 7 is a graph showing the relationships between stroke (stroke change resulting from deformation of the cushion plate), cushion load and hydraulic pressure in the present invention.
Figure 8:
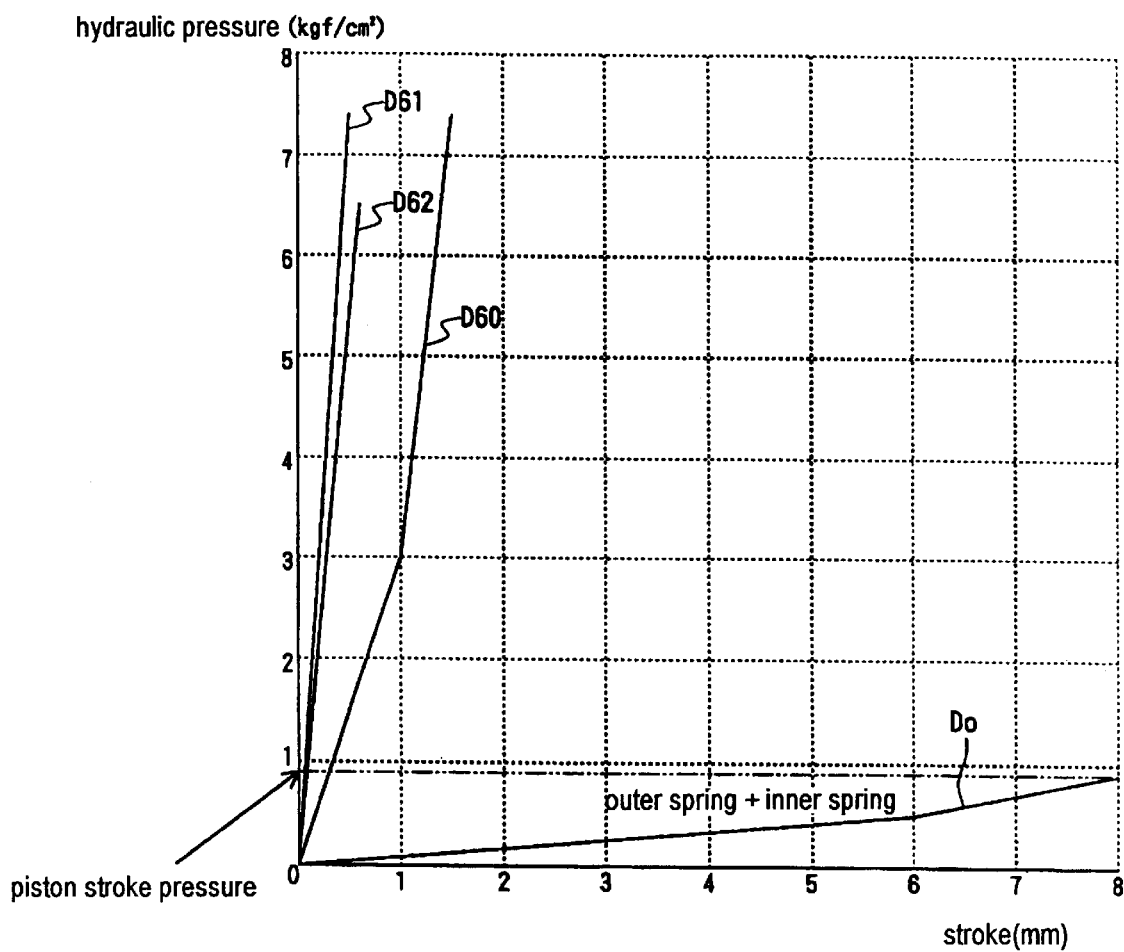
FIG. 8 is a graph showing the relationship between stroke (stroke change resulting from deformation of the cushion plate) and hydraulic pressure.

In the cushion plates 60, 61 and 62 employed in the preferred embodiments described above, the relationship among stroke (stroke change amount resulting from deformation of the cushion plates), cushion load and hydraulic pressure is as shown in FIGS. 7 and 8. In the drawings, reference symbol D60 relates to the cushion plate 60 shown in FIG. 2, reference symbol D61 relates to the cushion plate 61 shown in FIG. 3, reference symbol D62 relates to the cushion plate 62 shown in FIG. 4, and reference symbol D0 relates to the example of related art shown in FIG. 1 (in which the outer spring and the inner spring are provided but no cushion plate is provided). The zone where the cushion load is low is used to perform an up-shift operation from the second speed to the third speed (in stopping the drum 1 from rotating toward its self-energizing state), whereas the zone where the cushion load is high is used to perform a manual down-shift operation from the fifth speed to the third speed (in stopping the drum 1 from rotating in a de-energizing state).

Referring to FIG. 7, the cushion load changes linearly with respect to the stroke where the cushion plates 61 and 62 are each composed of a single disc spring (see the reference symbols D61 and D62), while the graph of the cushion load with respect to the stroke forms a line bent at one point for the cushion plate 60 composed of the two disc springs 60a and 60b (see the reference symbols D60). That is, on the self-energizing side where a predetermined braking force is applied at a relatively low hydraulic pressure (in performing the up-shift operation from the second speed to the third speed), the small-diameter disc spring 60a with a small modulus of elasticity functions exclusively. Conversely, on the de-energizing side where a relatively high hydraulic pressure is required to apply a predetermined braking force (in performing a manual down-shift from the fifth speed to the third speed), the small-diameter disc spring 60a is completely flexed and the large-diameter disc spring 60b with a large modulus of elasticity functions exclusively. Thus, the cushion plate 60 is capable of effectively absorbing oscillation due to its modulus of elasticity corresponding to a required hydraulic pressure both on the self-energizing side and on the de-energizing side.

Referring to FIG. 8, the outer spring (return spring) 34 and the inner spring 7 each have a modulus of elasticity which is much smaller than those of the aforementioned cushion plates 60, 61 and 62. The outer spring 34 and the inner spring 7 undergo great changes at a piston stroke pressure, namely, in a state prior to operation of (acquisition of a torque capacity by) the band brake 2 resulting from the filling of the brake engagement hydraulic chamber 32 with hydraulic pressure.

Figure 9:
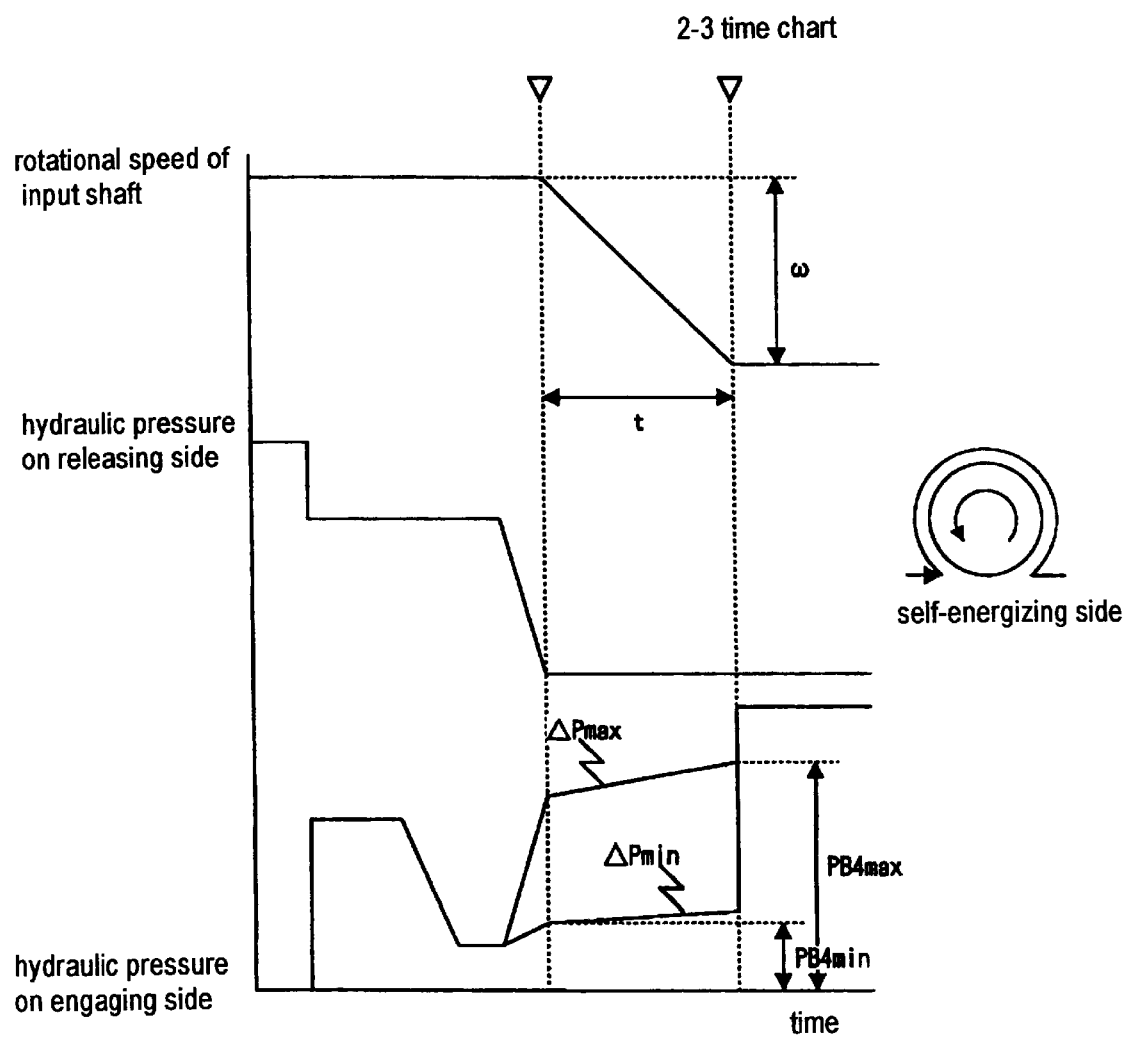
FIG. 9 is a time chart illustrating changes in hydraulic pressures and input shaft rotational speed at the time of an up-shift from the second speed to the third speed.

A method of calculating a cushion plate load will now be described with reference to FIG. 9 for an up-shift operation from the second speed to the third speed with the band brake in the self-energizing state.

(1) First, an engine torque TE is calculated using a map of a relationship between throttle opening degree and engine speed.

(2) Then, a torque ratio t is calculated from an input/output rotational ratio e, using a map.

(3) Then, these values TE and t are multiplied by each other so as to calculate an input torque Tt (=TE*t).

(4) Next, a maximum value $Tt_{max}$ and a minimum value $Tt_{min}$ for the input torque are calculated ($Tt_{max}$ corresponds to ⊖=100%, and $Tt_{min}$ corresponds to ⊖=0%).

(5) Then, these values are multiplied by a B4 torque distribution factor K to calculate $TB4_{max}$ and $TB4_{min}$ as shown below.

$$TB4_{max}=K*Tt_{max}$$

$$TB4_{min}32\ K*Tt_{min}$$

(6) Next, ω is calculated, and ω/t is calculated (t represents a target length of time for rotational change).

(7) Then, ω/t is multiplied by an inertia factor I to obtain Tω as shown below.

$$T\omega=I*(\omega/t)$$

Such calculation is unnecessary at the time of engine torque reduction.

(8) In the case of performing a manual down-shift operation from the fifth speed to the third speed, $PB4_{max}$ and $PB4_{min}$ are calculated as shown below.

$$PB4_{max}=(T\omega+TB4_{max})/A+B+[\Delta P_{max}*(t/2)]$$

$$PB4_{min}=(T\omega+TB4_{min})/A+B-[\Delta P_{min}*(t/2)]$$

In these formulas, A represents the product of piston area, the number of frictional members, effective radius and friction coefficient, and B represents a piston stroke pressure. The third term on the right side, i.e., $[\Delta P_{max}*(t/2)]$ or $[\Delta P_{min}*(t/2)]$, is necessary for controlling the wave form of torque during rotational change. The value of ΔP, which is set based on vehicle speed, increases with an increase in vehicle speed.

(9) Then, as cushion plate loads, $F_{max}$ and $F_{min}$ are calculated as shown below.

$$F_{max}=PB4_{max}*S$$

$$F_{min}=PB4_{min}*S$$

Figure 10:
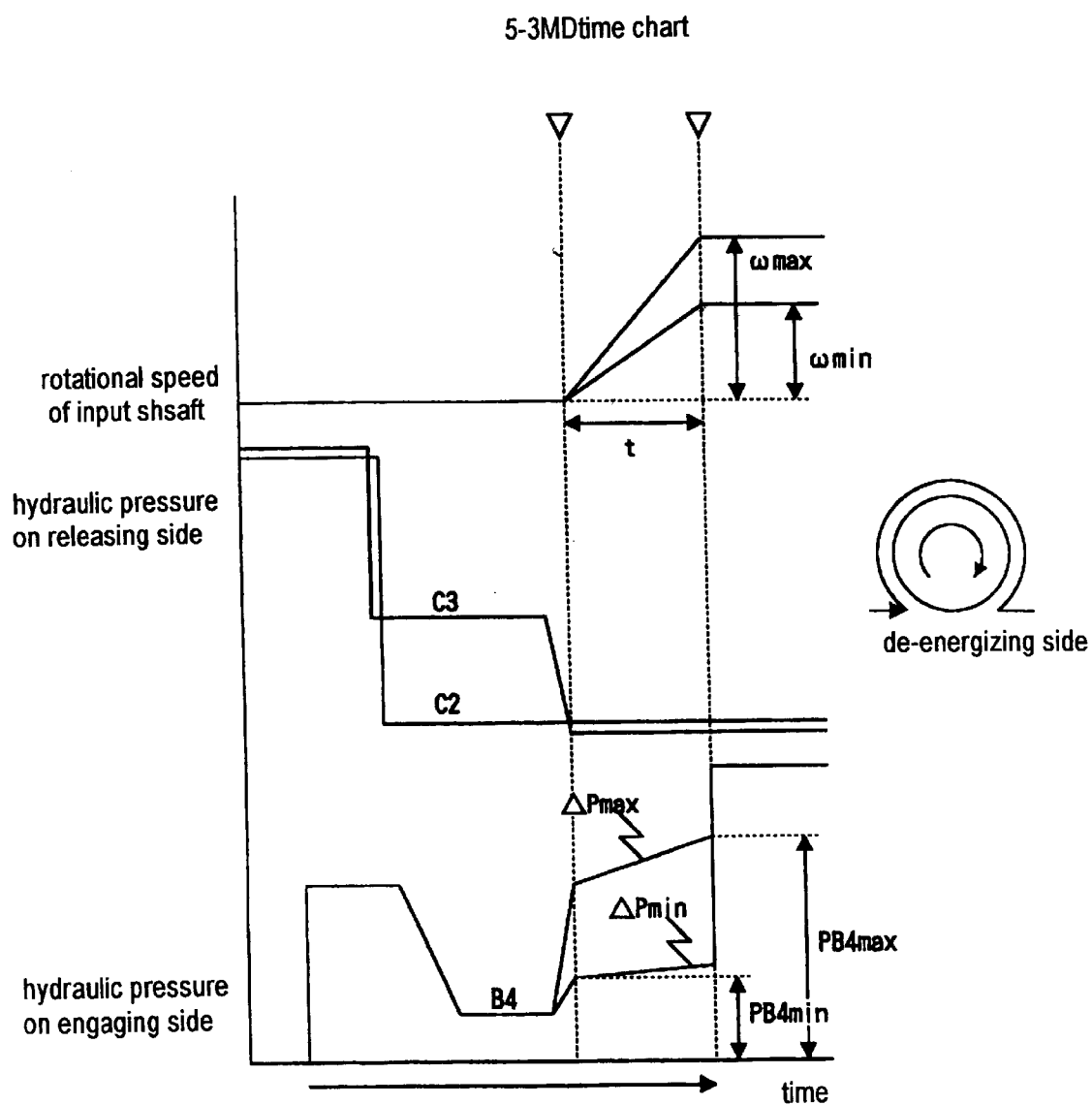
FIG. 10 is a time chart showing changes in hydraulic pressures and input shaft rotational speed in performing a manual down-shift from the fifth speed to the third speed.

A method of calculating a cushion load in manual downshift to the third speed on the de-energizing side will now be described with reference to FIG. 10. In general, while running at a constant speed in the D range, the vehicle is in the fifth speed state. In a manual down-shift from the fifth speed to the third speed the band brake is in the deenergizing state. FIG. 10 is a time chart showing changes in hydraulic pressures and input shaft rotatational speed in performing the manual down-shift operation from the fifth speed to the third speed.

The cushion plate load is calculated as follows.

(1) First of all, $\omega_{max}$ and $\omega_{min}$ are calculated.

(2) Based on the results of calculation, $\omega_{max}/t$ and $\omega_{min}/t$ are calculated.

In these formulas, t represents a target length of time for rotational change.

(3) Then, these values are multiplied by an inertia factor I so as to obtain $T\omega_{max}$ and $T\omega_{min}$ as shown below.

$$T\omega_{max}=I*(\omega_{max}/t)$$

$$T\omega_{min}=I*(\omega_{min}/t)$$

(4) A negative input torque Tt is multiplied by a B4 torque distribution factor K so as to obtain TB4=K*Tt.

(5) Then, these values are added to obtain $T\omega_{max}+TB4$ and $T\omega_{min}+TB4$.

(6) Next, $PB4_{max}$ and $PB4_{min}$ are calculated as shown below.

$$PB4_{max}=(T\omega_{max}+TB4)/A+B+[\Delta P_{max}*(t/2)]$$

$$PB4_{min}=(T\omega_{min}+TB4)/A+B+[\Delta P_{min}*(t/2)]$$

In these formulas, A represents a product of piston area, the number of frictional members, effective radius and friction coefficient, and B represents a piston stroke pressure. The third term on the right side is necessary in controlling the wave form of torque during the rotational change. The value of ΔP, which is set based on a vehicle speed, increases in accordance with an increase in vehicle speed.

(7) Then, as cushion plate loads, $F_{max}$ and $F_{min}$ are calculated as shown below.

$$F_{max}=PB4_{max}*S$$

$$F_{min}=PB4_{min}*S$$

In these formulas, S represents the area of the piston.

Figure 11:
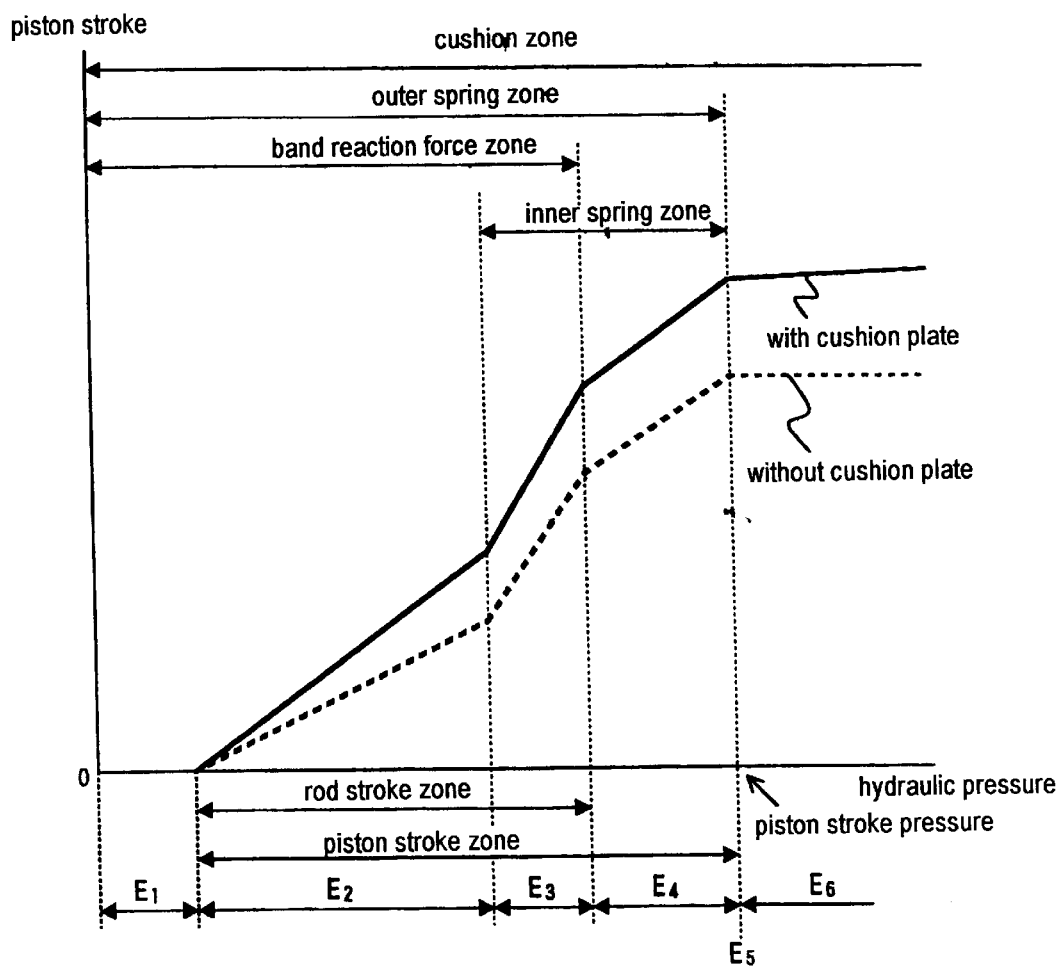
FIG. 11 is a graph showing the relationship between piston stroke and hydraulic pressure.

Next, the operation of this embodiment will be described with reference to FIGS. 2 and 11. Referring to FIG. 11, "the cushion zone" means a range where the cushion plate 60 can expand or contract in accordance with an increase or decrease in hydraulic pressure (a hydraulic pressure in the brake hydraulic chamber 32), "the outer spring zone" means a range where the outer spring 34 can expand or contract in accordance with an increase or decrease in hydraulic pressure, and "the inner spring zone" means a range where the inner spring 7 can expand or contract in accordance with an increase or decrease in hydraulic pressure. Further, "the band reaction force zone" means a range where the rod 33 receives a reaction force (hereinafter referred to as "the band reaction force") from the band 2, "the rod stroke zone" means a range where the rod 33 moves in accordance with an increase or decrease in the hydraulic pressure, and "the piston stroke zone" means a range where the piston 31 moves in accordance with an increase or decrease in the hydraulic pressure.

Before a hydraulic pressure is supplied to the brake hydraulic chamber 32 of the hydraulic servo 5, the piston 31 is located at the furthest left position allowed by the snap ring 40 (see the lower half of FIG. 2), the leading end of the rod 33 abuts the stop 2b on the second end 2c of the band 2, and the outer spring 34 and the inner spring 7 are compressed by predetermined lengths in comparison with their respective free lengths, thereby pushing back the piston 31 leftwards in FIG. 2.

In this state, even if the hydraulic pressure in the brake engagement hydraulic chamber 32 of the hydraulic servo 5 is increased, as long as the hydraulic pressure remains within a range indicated by a reference symbol El in FIG. 11, the force applied to the piston 31 by the outer spring 34 and the inner spring 7 (the force acting leftwards in FIG. 2) is greater than the force applied to the piston 31 by the aforementioned hydraulic pressure. Therefore, the piston 31 and the rod 33 do not move (that is, the rod stroke zone or the piston stroke zone cannot be reached)

If the hydraulic pressure is further increased to bring it into a range indicated by reference symbol E2, the force resulting from the hydraulic pressure becomes greater than the force applied to the piston 31 by the outer spring 34 and the inner spring 7. Thus, the piston 31 starts moving rightwards in FIG. 2, against the force applied thereto by those springs 34 and 7 (that is, the piston stroke zone is reached). At this moment, since the piston 31 is supported at one end on the casing 30 which is an unmovable rigid-body wall, the spring 34 is compressed in accordance with movement of the piston 31. On the other hand, since the inner spring 7 is only supported at one end on the movable rod 33, the inner spring 7 is hardly compressed at all by movement of the piston 31. The hydraulic force transmitted from the piston 31 through the cushion plate 60, the supporting plate 39 and the inner spring 7 serves to partially displace the rod 33 and the second end 2c of band 2 rightwards in FIG. 2. Thus, the rod stroke zone is reached.

If the hydraulic pressure is further increased to come into a range indicated by a reference symbol E3, the band 2 tightens on the drum 1 so that the band reaction force increases. In accordance with the increase in band reaction force, the inner spring 7 starts to undergo compression.

If the hydraulic pressure is further increased, the tightening of the band 2 reaches its limit so that the end portion 2c of the band 2 and the rod 33 cannot move. In this state, only the piston 31 moves while compressing the outer spring 34 and the inner spring 7 (see the reference symbol E4 in FIG. 11). Thus, the automatic transmission performs the speed-change operation.

When the hydraulic pressure reaches a predetermined value (see the reference symbol E5 in FIG. 11), the support plate 39 comes into engagement with a raised shoulder portion 33c on the rod 33 so that the inner spring 7 cannot be further compressed. With support plate 39 abutting the raised shoulder 33c, cushion plate 60 provides the only elastic force between the piston 31 and the rod 33 (and between the piston 31 and the band 2).

The cushion plate 60, disposed between the piston 31 and the rod 33, enables transmission of a hydraulic force from the piston 31 to the rod 33 to tighten the band 2 on the drum 1. Hence, when a hydraulic force is transmitted to tighten the band 2 on the drum 1 for torque transmission, even if the frictional force between the band 2 and the drum 1 changes erratically, i.e., slippage, the cushion plate 60 absorbs the resulting displacements (oscillation) of the rod 33 to prevent that oscillation from being transmitted to the piston 31.

According to this embodiment, the cushion plate 60 absorbs oscillation of the rod 33 as the band 2 tightens the drum 1. Thus, the band applies a substantially constant tightening force to the drum 1, whereby generation of judder as well as fluctuation of output torque is prevented.

While the present invention has been described with reference to what are presently considered to be the preferred embodiments, it is to be understood that the present invention is not limited to the disclosed embodiments or construction. On the contrary, the present invention is intended to cover various modifications and equivalent arrangements. In addition, while the various elements of the disclosed invention are shown in various combinations-and configurations, which are exemplary, other combinations and configurations, including more, less or only a single embodiment, are also within the spirit and scope of the present invention.

What is claimed is:

1. An automatic transmission comprising:

a speed-change gear mechanism;

a band brake including a drum connected to an element of the speed change gear mechanism for rotation therewith and a flexible band strip wound around the drum;

a hydraulic servo for tightening the flexible band strip on the drum in a speed-change operation, said hydraulic servo comprising:
a cylinder casing;
a piston slidably mounted within the cylinder casing;
a rod driven by said piston and engageable with one end of the flexible band strip;
a first spring disposed between said piston and said rod; and means limiting compression of said first spring; and
an elastic member mounted within said cylinder casing between the piston and the rod for transmission therethrough of a hydraulic force from the piston to the rod to tighten the flexible band strip on the drum, said elastic member isolating said piston from oscillations in movement of the rod generated by frictional force between said band strip and said drum in tightening the flexible band strip, said elastic member providing elastic dampening between said piston and said rod with said first spring at the limit of its compression.

2. The automatic transmission according to claim 1:

wherein the rod is supported by the piston for axial movement relative thereto, and wherein the elastic member comprises a disc spring.

3. The automatic transmission according to claim 2:

wherein said elastic member comprises at least two disc springs which have different moduluses of elasticity and are connected to one another in an axial series.

4. The automatic transmission according to claim 1, wherein said hydraulic servo further comprises:

a support plate mounted within said cylinder casing between said piston and said rod for reciprocating sliding movement in the same direction as the piston, said first spring being disposed between said support plate and said rod;

a second spring disposed between said support plate and said cylinder casing, coaxial with said first spring; and wherein said elastic member is disposed between said support plate and said piston.

5. The automatic transmission according to claim 2, wherein said hydraulic servo further comprises:

a support plate mounted within said cylinder casing between said piston and said rod for reciprocating sliding movement in the same direction as the piston, said first spring disposed between said support plate and said rod;

a second spring disposed between said support plate and said cylinder casing, coaxial with said first spring; and wherein said elastic member is disposed between said support plate and said piston.

6. The automatic transmission according to claim 3, wherein said hydraulic servo further comprises:

a support plate mounted within said cylinder casing between said piston and said rod for reciprocating sliding movement in the same direction as the piston, said first spring disposed between said support plate and said rod;

a second spring disposed between said support plate and said cylinder casing, coaxial with said first spring; and wherein said elastic member is disposed between said support plate and said piston.

7. A hydraulic servo for a band brake in an automatic transmission having a speed-change gear mechanism, wherein the band brake includes a drum connected to an element of the speed change gear mechanism for rotation therewith and a flexible band strip wound around the drum, and wherein the hydraulic servo operates to tighten the flexible band strip on the drum in a speed-change operation, said hydraulic servo comprising:

a cylinder casing;

a piston slidably mounted within the cylinder casing;

a rod driven by said piston and engageable with one end of the flexible band strip;

a first spring disposed between said piston and said rod; means limiting compression of said first spring; and an elastic member mounted within said cylinder casing between the piston and the rod for transmission therethrough of a hydraulic force from the piston to the rod to tighten the flexible band strip on the drum, said elastic member isolating said piston from oscillations in movement of the rod generated by frictional forces between said band strip and said drum in tightening the flexible band strip, said elastic member providing elastic dampening between said piston and said rod with said first spring at the limit of its compression.

8. A hydraulic servo according to claim 7:

wherein the rod is supported by the piston for axial movement relative thereto, and wherein the elastic member comprises a disc spring.

9. A hydraulic servo according to claim 8:

wherein said elastic member comprises at least two disc springs which have different moduluses of elasticity and are connected to one another in an axial series.

10. A hydraulic servo according to claim 7, further comprising:

a support plate mounted within said cylinder casing between said piston and said rod for reciprocating sliding movement in the same direction as the piston, said first spring disposed between said support plate and said rod;

a second spring disposed between said support plate and said cylinder casing, coaxial with said first spring; and wherein said elastic member is disposed between said support plate and said piston.

11. A hydraulic servo according to claim 8, further comprising:

a support plate mounted within said cylinder casing between said piston and said rod for reciprocating sliding movement in the same direction as the piston, said first spring disposed between said support plate and said rod;

a second spring disposed between said support plate and said cylinder casing, coaxial with said first spring; and wherein said elastic member is disposed between said support plate and said piston.

12. A hydraulic servo according to claim 9, further comprising:

a support plate mounted within said cylinder casing between said piston and said rod for reciprocating sliding movement in the same direction as the piston, said first spring disposed between said support plate and said rod;

a second spring disposed between said support plate and said cylinder casing, coaxial with said first spring; and wherein said elastic member is disposed between said support plate and said piston.

* * * * *

UNITED STATES PATENT AND TRADEMARK OFFICE
CERTIFICATE OF CORRECTION

PATENT NO. : 6,422,356 B1
DATED : July 23, 2002
INVENTOR(S) : Suzuki et al.

It is certified that error appears in the above-identified patent and that said Letters Patent is hereby corrected as shown below:

Column 3,
Line 4, delete "first";
Line 5, delete "spring." and insert -- piston. --.

Column 4,
Line 23, "port ion" should read -- portion --.

Column 9,
Line 38, "$TB4_{min}32\ K*Tt_{min}$" should read -- $TB4_{min}= K*Tt_{min}$ --.

Column 11,
Line 17, after "reached)" insert a period -- . --.

Column 12,
Line 10, "combinations-and" should read -- combinations and --; and
Line 31, delete "and means" insert -- means --.

Signed and Sealed this

Fifteenth Day of April, 2003

JAMES E. ROGAN
*Director of the United States Patent and Trademark Office*